United States Patent [19]

Maeda et al.

[11] Patent Number: 5,062,926
[45] Date of Patent: Nov. 5, 1991

[54] SOLVENT RECOVERY APPARATUS

[75] Inventors: Takeshi Maeda, Kobe; Hiroshi Kawaguchi, Ibaraki; Harukazu Yamaguchi, Izumi; Hitoshi Sakai, Tokyo; Akio Ando, Yokohama; Yasuo Matsushita; Tetsuya Takemoto, both of Osaka, all of Japan

[73] Assignees: Osaka Gas Limited, Osaka; Asahi Seisakusho Company Limited, Tokyo, both of Japan

[21] Appl. No.: 589,518

[22] Filed: Sep. 28, 1990

[30] Foreign Application Priority Data

Oct. 9, 1989 [JP] Japan .............................. 1-118435[U]

[51] Int. Cl.$^5$ ............................................. B01D 53/14
[52] U.S. Cl. ...................................... 202/183; 55/387
[58] Field of Search .................. 55/48, 74, 93, 94, 228, 55/46, 47, 59, 88, 387; 202/183, 184

[56] References Cited

U.S. PATENT DOCUMENTS 4,054,429 10/1977 Ostosic et al. ............................ 55/74

FOREIGN PATENT DOCUMENTS 3113673 10/1982 Fed. Rep. of Germany .
3124388 2/1983 Fed. Rep. of Germany .

Primary Examiner—Frank Sever
Attorney, Agent, or Firm—Spencer & Frank

[57] ABSTRACT

The solvent recovery apparatus includes an adsorption tower having a gas adsorption element; a gas supply pipe for supplying a solvent-containing gas to the adsorption tower; a steam supply pipe for supplying steam to the adsorption tower; and a solvent recovery pipe for recovering a removed solvent. Disposed at the solvent recovery pipe are a condenser and a specific-gravity separating unit for recovering a liquefield solvent. An intermediate liquid storing unit is disposed between the condenser and the specific-gravity separating unit, and has a valve adapted to be automatically opened when the intermediate liquid storing unit stores a liquid of which amount exceeds a preset value, so that the liquid flows into the specific-gravity separating unit. With this solvent recovery apparatus, organic solvent gas or flon gas may be recovered.

16 Claims, 6 Drawing Sheets

# SOLVENT RECOVERY APPARATUS

REFERENCE TO RELATED APPLICATIONS

This application claims the priority of Japanese patent application No. 118435/1989 (filed on Oct. 9, 1989), which is incorporated herein by reference.

FIELD OF THE INVENTION

The present invention relates to a solvent recovery apparatus for recovering (i) organic solvent gas contained in exhaust gas in coating factories and the like, and (ii) flon gas (e.g., Flon-113), tetrachloroethylene gas, 1,1,1-trichloroethylene gas and the like exhausted from ultrasonic cleaning machines used in semiconductor factories, dry-cleaning machines used in dry cleaners and the like.

BACKGROUND OF THE INVENTION

There is known a solvent recovery apparatus comprising:
- an adsorption tower having a gas adsorption element;
- a gas supply pipe for supplying solvent-containing gas to be treated;
- a steam supply pipe for supplying steam to be used for solvent removal;
- a solvent recovery pipe for recovering a removed solvent;
- the gas supply pipe, the steam supply pipe and the solvent recovery pipe being connected to the adsorption tower;
- a condenser for cooling and liquefying gas containing a solvent removed from the gas adsorption element; and
- a specific-gravity separating unit for recovering a liquefied solvent as separated from water by specific gravity;
- the condenser and the specific-gravity separating unit being connected to the solvent recovery pipe.

When conventionally separating and recovering a solvent from solvent-containing gas to be treated with the use of the solvent recovery apparatus of the type above-mentioned, solvent-containing gas exhausted from the adsorption tower by the supply of steam is supplied to the condenser by which both the steam and the solvent are liquefied, and the resultant mixture of water and the liquefied solvent is then supplied to the specific-gravity separating unit in which only the liquefied solvent, having been separated from the water by specific gravity, is recovered.

For a solvent, such as fluorocarbons, which has a specific gravity greater than that of water, the specific-gravity separating unit is conventionally arranged as shown in FIG. 9 (a). More specifically, connected to the top of a lateral side of a casing 101 is a supply pipe 102 which forms a part of the solvent recovery pipe and which supplies a liquid mixture of water W and a solvent L liquefied by the condenser. The casing 101 is provided at a portion thereof, apart from the portion thereof connected to the supply pipe 102, with a partition wall 103 to be used for separation of the liquid mixture by specific gravity. A water receiving portion 104 for recovering the water W by overflow is formed at the upper portion of the partition wall 103 to a side of the supply pipe 102. The water receiving portion 104 has a drain port 105. An outlet port 106 for the liquefied solvent L is formed at the opposite side of the water receiving portion 104 with respect to the partition wall 103. The liquid mixture of the water W and the liquefied solvent L is supplied into the casing 101 and, as a result of the difference in their specific gravity, the water W and the liquefied solvent L separate respectively into an upper layer and a lower layer so that the water W in the upper layer is recovered through the water receiving portion 104 and the drain port 105, and the liquefied solvent L in the lower layer passes below the lower end of the partition wall 103 and is recovered through the outlet port 106.

For a solvent L having a specific gravity which is smaller than that of water, provision is made such that the water W and the liquefied solvent L are respectively discharged from the outlet port 106 and the drain port 105.

In the solvent recovery apparatus above-mentioned, when steam is supplied for removing a solvent adsorbed by the gas adsorption element of the adsorption tower, the air present in the adsorption tower is suddenly expanded as it is heated, thereby to increase the internal pressure in the adsorption tower. Further, the pressure of the steam at the time the same is supplied, is added to the internal pressure. Accordingly, the internal pressure in the casing 101 of the specific-gravity separating unit is suddenly increased. When the internal pressure in the casing 101 is suddenly increased, the liquid level therein is lowered as shown in FIG. 9 (b). This causes the level of the water W which has separated into the upper layer to be lowered below the lower end of the partition wall 103. Thus, the water W accidentally flows into the space at the side of the outlet port 106. Accordingly, the liquefied solvent L which is recovered is contaminated with the water W, so that the liquefied solvent L thus recovered cannot be reused.

Further, the gas phase in the condenser contains a solvent in an amount which corresponds to a saturated vapor pressure at the cooling temperature of the condenser. The concentration of the solvent is considerably higher than that of the solvent contained in gas supplied from the gas supply pipe. At the time of solvent removal where the pressure is suddenly increased, the high-concentration solvent present in the gas phase in the condenser and gas containing a solvent removed from the gas adsorption element flow, without being condensed and liquefied by the condenser, into the drain port 105, and leak to the outside. This decreases the efficiency of solvent recovery. Such leakage of solvent-containing gas is considerable particularly in a solvent recovery apparatus of the one-tower type having one adsorption tower in which solvent adsorption and solvent removal are alternately carried out.

SUMMARY OF THE INVENTION

It is an object of the present invention to provide a solvent recovery apparatus capable of preventing the transmission, to the specific-gravity separating unit, of an increased pressure present in the supply of steam used for solvent removal, thus enabling recovery of the removed solvent substantially free of water.

It is another object of the present invention to provide a solvent recovery apparatus with which, even though the pressure in the apparatus is increased, a solvent in gas which has not been condensed and liquefied by a condenser, may be efficiently recovered without leakage to the outside.

To achieve the objects above-mentioned, the solvent recovery apparatus in accordance with the present invention includes: an adsorption tower having a gas adsorption element and an openable exhaust portion; a gas supply pipe for supplying solvent-containing gas to be treated; a steam supply pipe for supplying steam to be used for solvent removal; and a solvent recovery pipe for recovering a removed solvent. The gas supply pipe, the steam supply pipe and the solvent recovery pipe are connected to the adsorption tower.

The apparatus according to the invention also includes (i) a condenser for cooling and liquefying a gas containing a solvent removed from the gas adsorption element and (ii) a specific-gravity separating unit for separating, by specific gravity, a liquid mixture discharged from the condenser, thereby to recover a liquefied solvent. The condenser and specific-gravity separating unit are connected to the solvent recovery pipe. Disposed between the condenser and the specific-gravity separating unit is an intermediate liquid storing unit for temporarily storing a liquid mixture of water and the solvent liquefied by the condenser. The intermediate liquid storing unit has a valve adapted to be automatically opened when the intermediate liquid storing unit stores an amount of liquid which exceeds a preset value, so that the excess liquid flows into the specific-gravity separating unit. When a pressure acting on this valve increases with the supply of steam used for solvent removal, the valve is closed to prevent the transmission of the increased pressure to the specific-gravity separating unit. This prevents the level of water in the specific-gravity separating unit in the upper layer which has separated from the liquefied solvent from being lowered so that the water flows toward the outlet port for the liquefied solvent. In the specific-gravity separating unit, a liquefied solvent, which has been satisfactorily separated from the water and can be reused, may be recovered.

The valve is preferably a float valve. Preferably, the float valve has a float valve body adapted to be raised by the buoyancy of the liquid and a valve seat adapted to receive and support the float valve body at such a position that the float valve is closed. The float valve is provided, between the float valve body and the valve seat, with a passage in which a small amount of the liquid flows while the float valve body is located in the closed position. Such passage prevents the separated liquid layers in the specific-gravity separating unit from being disturbed by a sudden inflow of a great amount of the liquid into the specific-gravity separating unit.

To prevent the leakage of solvent gas to the outside, a capacity-variable buffer unit is disposed between the condenser and the intermediate liquid storing unit for storing solvent-containing gas which has not been liquefied by the condenser. The solvent-containing gas stored in the buffer unit is supplied to the adsorption tower through a recycle pipe.

The present invention may be applied not only to a solvent recovery apparatus having a plurality of adsorption towers, but also to a solvent recovery apparatus of the one-tower type having one adsorption tower. In the adsorption tower, adsorption of solvent-containing gas to be treated, and removal of an adsorbed solvent are alternately carried out.

These objects and advantages of the present invention will be more completely understood from the following detailed description with reference to the attached drawings.

DETAILED DESCRIPTION OF THE PREFERRED EMBODIMENTS

Figure 1:
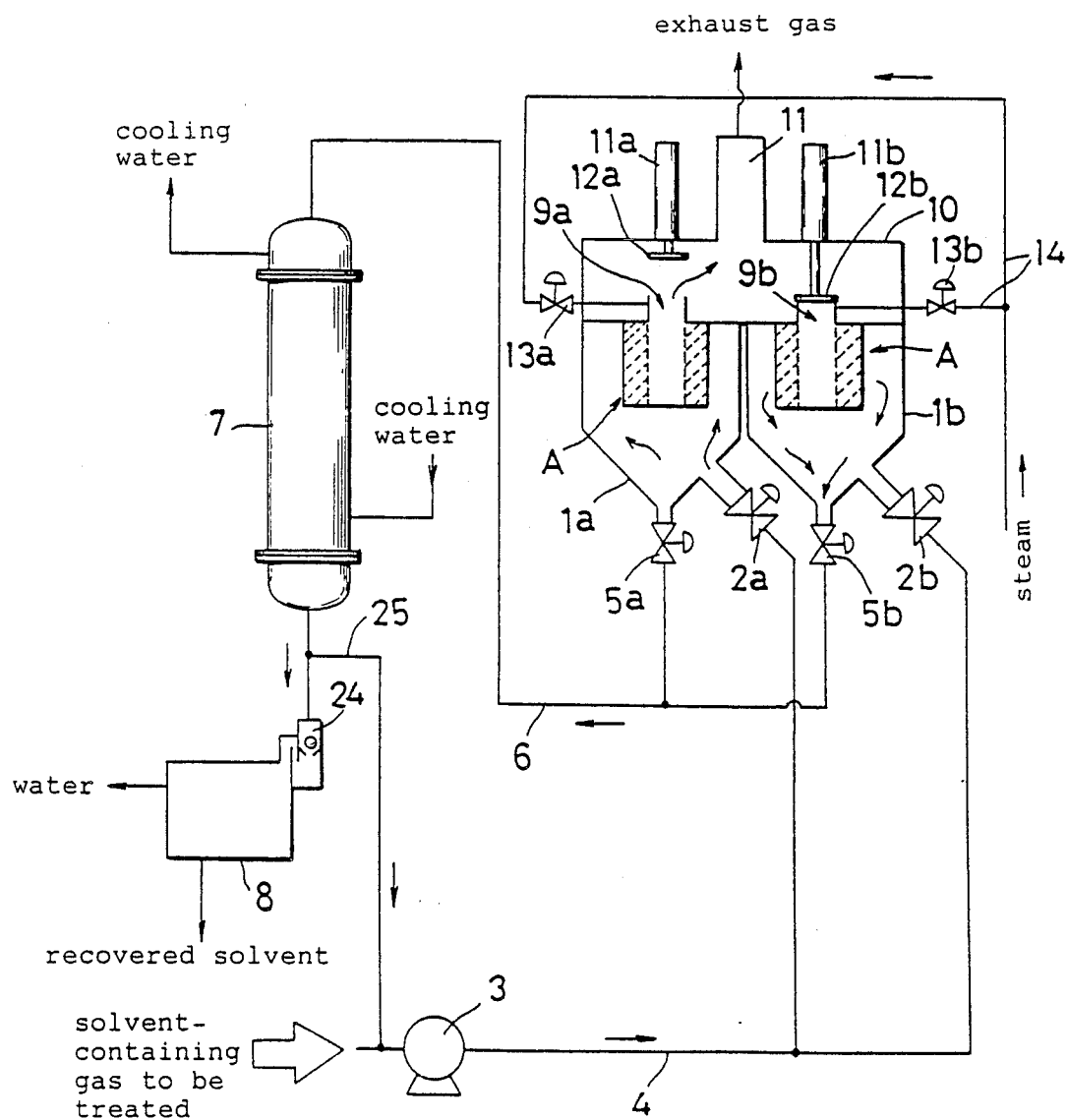
FIG. 1 is a schematic diagram of a solvent recovery apparatus in accordance with an embodiment of the present invention.

With reference to FIG. 1, the apparatus in accordance with an embodiment of the present invention has adsorption towers 1a, 1b, as disposed in parallel, to which cylindrical gas adsorption elements A comprised of activated carbon fibers are respectively attached as filters. Connected to the lower spaces of the adsorption towers 1a, 1b are (i) a gas supply pipe 4 through first motor ball valves 2a, 2b, and (ii) a solvent recovery pipe 6 through second motor ball valves 5a, 5b. A gas supply blower 3 for supplying a solvent-containing gas to be treated to the towers 1a, 1b is disposed at the gas supply pipe 4. A condenser 7, an intermediate liquid storing unit 24 and a specific-gravity separating unit 8 are successively connected to the solvent recovery pipe 6.

Disposed at the upper portions of the adsorption towers 1a, 1b are exhaust portions 9a, 9b for exhausting gas of which solvent has been adsorbed and removed. An exhaust pipe 11 is connected to a cover 10 which covers the upper portions of the adsorption towers 1a, 1b. Attached to the cover 10 are air cylinders 11a, 11b respectively having valve bodies 12a, 12b for respectively opening/closing the exhaust portions 9a, 9b. A steam supply pipe 14 for supplying steam to the adsorption towers 1a, 1b respectively closed by the valve bodies 12a, 12b, is connected to the exhaust portions 9a, 9b through third motor ball valves 13a, 13b. The steam from the steam supply pipe and carries away the solvent from the adsorption element A.

The first motor ball valves 2a, 2b, the second motor ball valves 5a, 5b, the third motor ball valves 13a, 13b and the valve bodies 12a, 12b are adapted such that the valves 2a, 5b, 13b and the valve body 12a are opened or closed while the valves 2b, 5a, 13a and the valve body 12b are closed or opened. In the adsorption towers 1a, 1b, the adsorption of the solvent-containing gas to be treated and the removal of an adsorbed solvent are alternately carried out. More specifically, in one adsorption tower 1a, the first motor ball valve 2a is opened, the exhaust portion 9a is opened and the second motor ball valve 5a is closed. The solvent-containing gas to be treated is then supplied from the gas supply pipe 4 to the adsorption tower 1a so that the gas thus supplied passes through the gas adsorption element A. The solvent contained in the gas is removed as adsorbed by the activated carbon fibers of the gas adsorption element A. The gas from which solvent has been removed, is exhausted from the exhaust pipe 11 through the exhaust portion 9a. In the other adsorption tower 1b, the motor ball valve 2b is closed, the exhaust portion 9b is closed by the valve body 12b and the second and third motor ball valves 5b, 13b are opened. The steam is then supplied from the steam supply pipe 14 to the adsorption tower 1b to heat the adsorption element A and remove a solvent adsorbed by the activated carbon fibers of the adsorption element A, thus regenerating the activated carbon fibers. The solvent thus removed is supplied, together with the steam, to the condenser 7 where the solvent and the steam are condensed and liquefied. The resultant water-solvent liquid mixture is then supplied, through the solvent recovery pipe 6 and the intermediate liquid storing unit 24, to the specific-gravity separating unit 8 where the liquefied solvent is recovered as separated from the water.

Figure 2A:
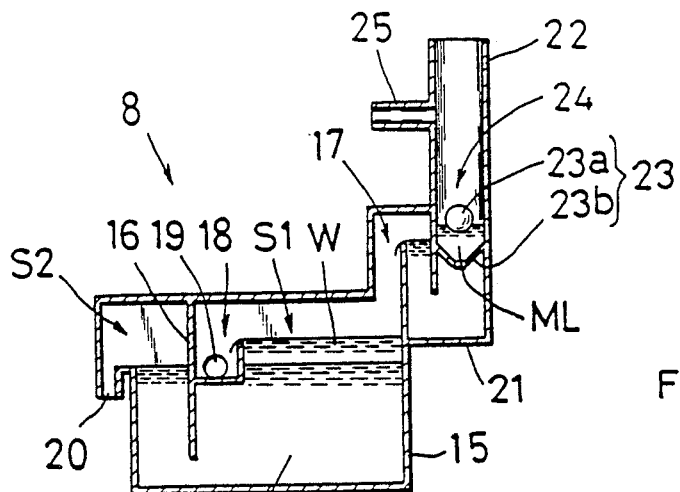
FIG. 2 (a) and (b) are sectional views of a specific-gravity separating unit and an intermediate liquid storing unit in the apparatus of FIG. 1.
Figure 2B:
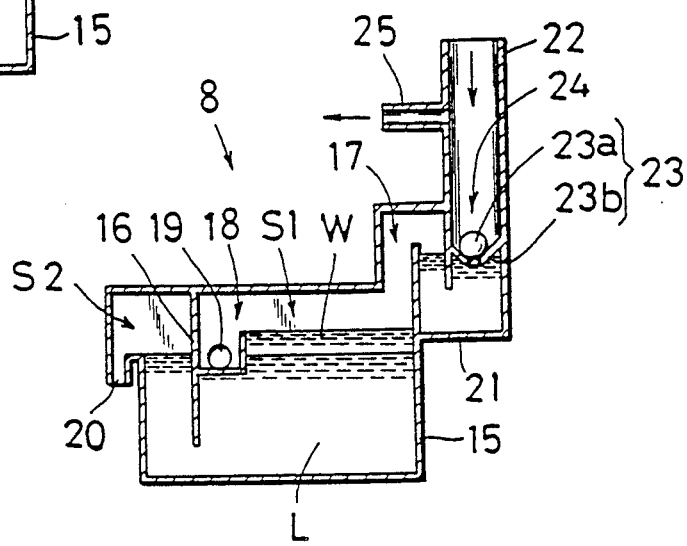

As shown in FIG. 2 (a), the specific-gravity separating unit 8 has a casing 15 of which inside is divided, by a partition wall 16 for separation by specific gravity, into a first space S1 and a second space S2 of which only lower portions communicate with each other. Formed in the first space S1 is a liquid supply portion 17 for supplying the liquid mixture of the liquefied solvent L and water W liquefied by the condenser 7. The liquid supply portion 17 is formed at a predetermined position above the casing 15 which is apart from the partition wall 16.

The following description will discuss the apparatus so arranged as to treat a solvent L, such as fluorocarbons, which has a specific gravity greater than that of water W.

Formed at an upper portion of the partition wall 16 in the first space S1 is a water receiving portion 18 for receiving water W by overflow. The water receiving portion 18 has a drain port 19. An outlet port 20 for the liquefied solvent L is disposed at the position opposite to the water receiving portion 18 with respect to the partition wall 16. A liquid mixture of the water W and the liquefied solvent L is supplied into the casing 15. As a result of the difference in specific gravity between the water W and the liquefied solvent L, the liquid mixture separates respectively into an upper layer and a lower layer. The water W in the upper layer is recovered through the water receiving portion 18 and the drain port 19. On the other hand, the liquefied solvent L in the lower layer passes below the lower end of the partition wall 16 and is recovered through the outlet port 20.

An intermediate reservoir 21 is formed adjacent to the liquid supply portion 17 of the specific-gravity separating unit 8. Connected to this intermediate reservoir 21 is a communication pipe 22 which forms a part of the solvent recovery pipe 6 and which communicates with the condenser 7. Disposed in the communication pipe 22 is a float valve 23 having (i) a valve seat 23b provided at the center thereof with an opening and (ii) a float valve body 23a of which specific gravity is smaller than that of water or the solvent whichever is the smaller, the float valve body 23a being adapted to close the opening of the valve seat 23b. Thus, the intermediate liquid storing unit 24 communicating with the first space S1 is formed.

More specifically, as shown in FIG. 2 (a), when a solvent removal operation becomes steady state after steam has been supplied to start the solvent removal operation, the liquid mixture ML of the liquefied solvent L and the water W, as liquefied after being cooled and condensed by the condenser 7, is stored in the intermediate liquid storing unit 24. When the amount of the stored liquid exceeds a preset value, the float valve body 23a is raised from the valve seat 23b due to buoyancy. The float valve 23 is then opened, causing the liquid mixture ML to flow into the intermediate reservoir 21. The liquid mixture ML is then supplied from the intermediate reservoir 21 to the specific-gravity separating unit 8. The float valve body 23a may be made of any of various materials, such as Teflon (manufactured by Dupont Co., Ltd.), which have resistance to corrosion from a solvent and which may be so arranged as to have specific gravity smaller than that of water or the solvent whichever is the smaller.

That part of the communication pipe 22 above the intermediate liquid storing unit 24 is connected to that part of the gas supply pipe 4 upstream of the gas supply blower 3 by a recycle pipe 25.

According to the solvent recovery apparatus having the arrangement above-mentioned, when, at the starting time of solvent removal, the steam is supplied to the adsorption tower 1b so that the internal pressure therein is suddenly increased with expansion of the heated air therein, this increased pressure acts on the float valve 23 to push down the float valve body 23a, causing the same to be pushed to the valve seat 23b, as shown in FIG. 2 (b). Thus, the float valve 23 is closed. This intercepts the transmission of the increased pressure from the intermediate liquid storing unit 24 to the specific-gravity separating unit 8. At this time, the solvent-containing gas at a high concentration in the condenser 7 and the communication pipe 22, flows from the recycle pipe 25 into the gas supply pipe 4. This restrains the pressure in the condenser 7 or the communication pipe 22 from being increased. At the same time, both solvent-containing gas at a high concentration and gas which contains the solvent and which has been insufficiently treated, are returned to the adsorption tower 1a, where these gases are subjected again to an adsorption treatment.

The following description will discuss the result of a test conducted on the solvent recovery apparatus having the arrangement above-mentioned.

When air having a pressure of 400 mm $H_2O$ was let flow into the solvent recovery apparatus, the float valve 23 was closed to prevent the inflow of the air into the specific-gravity separating unit 8. This prevented the transmission of the pressure to the specific-gravity separating unit 8 due to sudden increase in internal pressure. In this solvent recovery apparatus, gas containing Flon-113 was subjected to solvent adsorption and solvent removal to be carried out by supplying the steam. Then, there was recovered liquefied Flon-113 with which no water was contaminated and which can be reused as it is. It is apparent from the test result above-mentioned that the solvent recovery apparatus securely and satisfactorily achieves the separation of water from a liquefied solvent by specific gravity, without adverse effect exerted on the separation by specific gravity.

Figure 3:
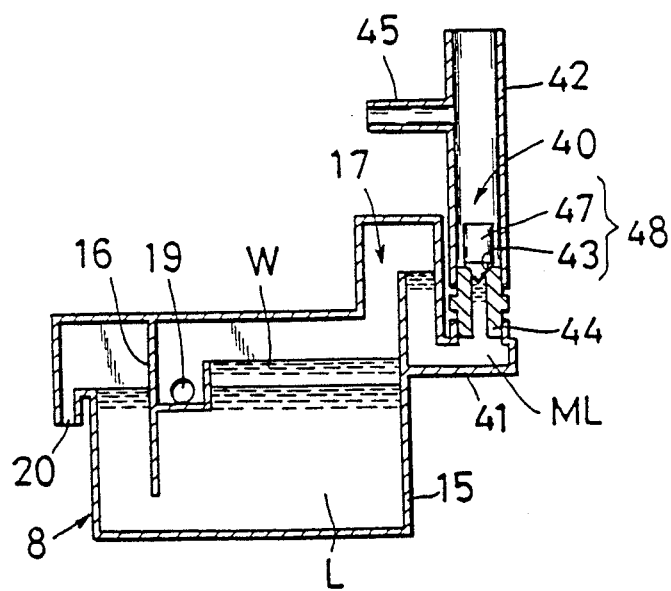
FIG. 3 is a sectional view of the specific-gravity separating unit and the intermediate liquid storing unit in a solvent recovery apparatus in accordance with another embodiment of the present invention.
Figure 4:
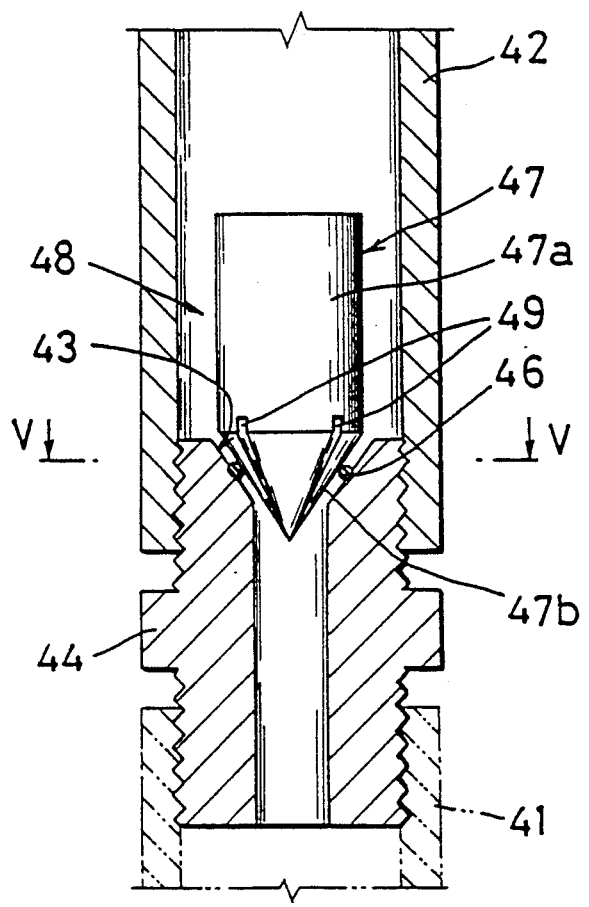
FIG. 4 is an enlarged view of the intermediate liquid storing unit shown in FIG. 3.
Figure 5:
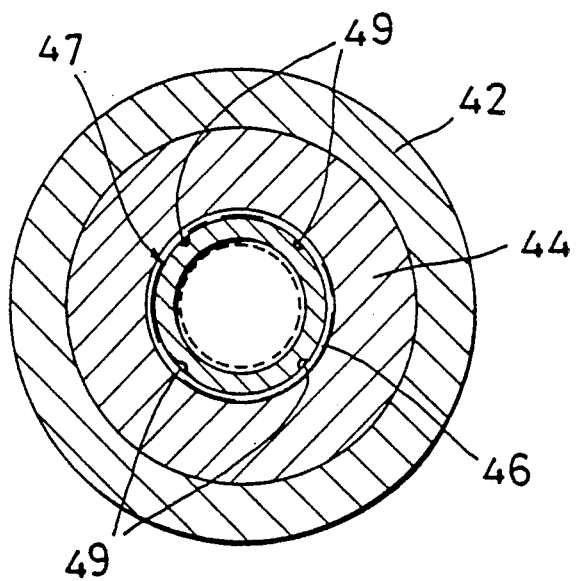
FIG. 5 is an enlarged sectional view taken along the line V—V in FIG. 4.

In another embodiment of the present invention shown in FIGS. 3 to 5, a specific-gravity separating unit 8 is arranged in the same manner as in the embodiment mentioned earlier. In the embodiment in FIGS. 3 to 5, like parts are designated by like reference numerals used in FIG. 2, and the description of the specific-gravity separating unit 8 is omitted here.

An intermediate reservoir 41 adjacent to a liquid supply portion 17 of the specific-gravity separating unit 8 is connected to a communication pipe 42 through a valve-seat forming member 44 having a valve seat 43. The communication pipe 42 is connected to a recycle pipe 45 connected to a gas supply pipe 4. A sealing O-ring 46 is attached to the valve seat 43.

Disposed above the valve seat 43 is a float valve body 47 having a cylindrical portion 47a and a conical portion 47b extended from the lower end of the cylindrical portion 47a. The valve seat 43 and the float valve body 47 form a float valve 48. An intermediate liquid storing unit 40 is formed by disposing the float valve 48 in the communication pipe 42.

The conical portion 47b of the float valve body 47 is provided on the surface thereof with four narrow grooves 49 at predetermined spatial intervals in the circumferential direction, these grooves 49 extending toward the apex of the conical portion 47b. When the float valve body 47 is located in the position to close the valve seat 43, the grooves 49 form, between the sealing O-ring 46 and the conical portion 47b of the float valve body 47, passages in which a small amount of a liquid flows.

The intermediate liquid storing unit 40 is arranged in the manner above-mentioned. Accordingly, when a solvent removal operation becomes steady state after the steam has been supplied to start the solvent removal operation, a liquid mixture ML of a liquefied solvent L and water W as liquefied after being cooled and condensed by the condenser 7, is stored in the intermediate liquid storing unit 40. Further, a small amount of the liquid always flows into the intermediate reservoir 41 through the passages formed by the grooves 49. In an arrangement using a normal float valve, only at the time when a preset amount of the liquid is stored, the float valve is opened and the preset amount of the liquid intermittently flows toward the specific-gravity separating unit 8. As compared with such an arrangement, the arrangement shown in FIGS. 3 to 5 may reduces the frequency at which the float valve 48 is opened. Further, the arrangement shown in FIGS. 3 to 5 prevents a great amount of the liquid from suddenly flowing toward the specific-gravity separating unit 8. This assures a smooth flow of the liquid to the specific-gravity separating unit 8, thereby to prevent the separated liquid layers therein from being disturbed. Accordingly, liquid separation by specific gravity in a steady state may be carried out more satisfactorily. When the liquid stored amount exceeds the preset value, the liquid is apt to be guided under the float valve body 47 by the passages. This causes the float valve body 47 to be smoothly raised due to buoyancy. Thus, the float valve 48 is opened, causing the liquid mixture ML to flow into the intermediate reservoir 41. The liquid is then supplied from the intermediate reservoir 41 to the specific-gravity separating unit 8.

In the embodiment above-mentioned, the grooves may be alternately formed in the valve seat 43, or both in the float valve body 47 and the valve seat 43, thus forming passages in which a small amount of the liquid flows. Further, the number of the grooves 49 should not be limited to four as above-mentioned, but may be suitably selected.

Figure 6:
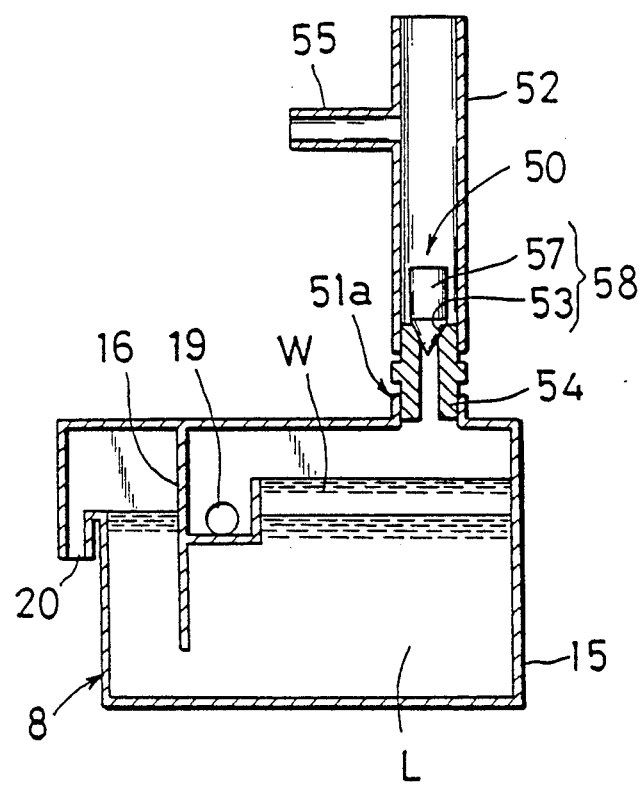
FIG. 6 is a sectional view of the specific-gravity separating unit and the intermediate liquid storing unit in a solvent recovery apparatus in accordance with a further embodiment of the present invention.

FIG. 6 shows a further embodiment of the present invention in which elements of a specific-gravity separating unit 8 common to those in the embodiments above-mentioned are designated by like reference numerals. The embodiment in FIG. 6 is different from the embodiment in FIGS. 3 to 5 in the following respects.

In the embodiment in FIG. 6, a connection case portion 51a projects from that portion of a top cover separated from a partition wall 16 of a casing 15. The connection case portion 51a is connected to a communication pipe 52 through a valve-seat forming member 54 having a valve seat 53. Such an arrangement eliminates the intermediate reservoir 41 in the embodiment shown in FIGS. 3 to 5.

In the same manner as in the embodiment in FIGS. 3 to 5, the valve seat 53 and a float valve body 57 form a float valve 58. A recycle pipe 55 is connected to the communication pipe 52. An intermediate liquid storing unit 50 is formed by disposing the float valve 58 in the communication pipe 52.

Figure 7:
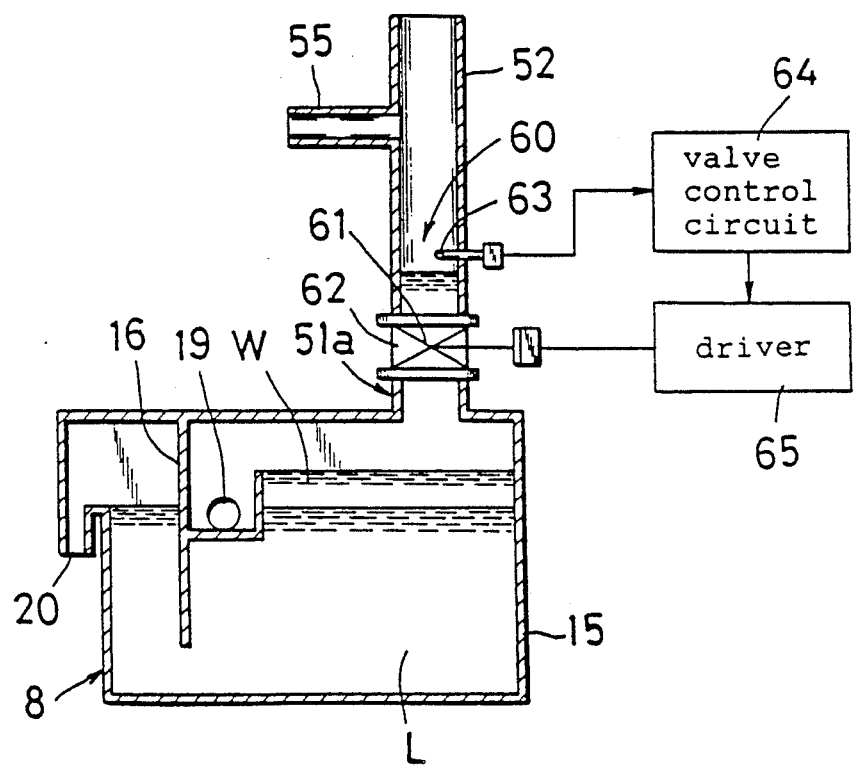
FIG. 7 is a sectional view of the specific-gravity separating unit and the intermediate liquid storing unit in a solvent recovery apparatus in accordance with still another embodiment of the present invention.

FIG. 7 shows still another embodiment of the present invention, which is different from the embodiment in FIG. 6 in the following points.

In the embodiment in FIG. 7, a connection case portion 51a is connected to a communication pipe 52 through a valve box 62 having, as a valve, an opening/closing valve 61 of the electromagnetic operation type. While the opening/closing valve 61 is closed, a liquid from a condenser 7 is stored in an intermediate liquid storing unit 60. A level sensor 63 is disposed at a predetermined position above the opening/closing valve 61 for detecting that the amount of the liquid stored in the intermediate liquid storing unit 60 has exceeded a preset value. This level sensor 63 is connected to a valve control circuit 64, which is connected to a driver 65 for driving the opening/closing valve 61. In response to a signal supplied from the level sensor 63, the valve control circuit 64 is adapted to supply a drive signal to the driver 65. In response to the drive signal, the driver 65 is adapted to open the opening/closing valve 61 for a predetermined period of time, thereby to supply a predetermined amount of the liquid stored in the intermediate liquid storing unit 60 to the specific-gravity separating unit 8. The period of time during which the opening/closing valve 61 is open, i.e., the amount of the liquid supplied to the specific-gravity separating unit 8, may be set to, for example, about 80% of the amount of the liquid to be detected by the level sensor 63. The period of time during which the opening/closing valve 61 is open/closed, may be experimentally determined according to the sizes of the apparatus. Instead of the level sensor, a level meter may be used for level control.

Each of the intermediate liquid storing units 24, 40, 50, 60 may be disposed between the condenser 7 and the specific-gravity separating unit 8 regardless of the position of the specific-gravity separating unit 8 and the position adjacent to the specific-gravity separating unit 8.

The present invention may be applied not only to a solvent recovery apparatus having a plurality of adsorption towers where solvent adsorption and solvent removal are alternately and repeatedly carried out so that a liquefied solvent is continuously recovered, but also to a solvent recovery apparatus of the one-tower type having one adsorption tower where a liquefied solvent is intermittently recovered.

Figure 8:
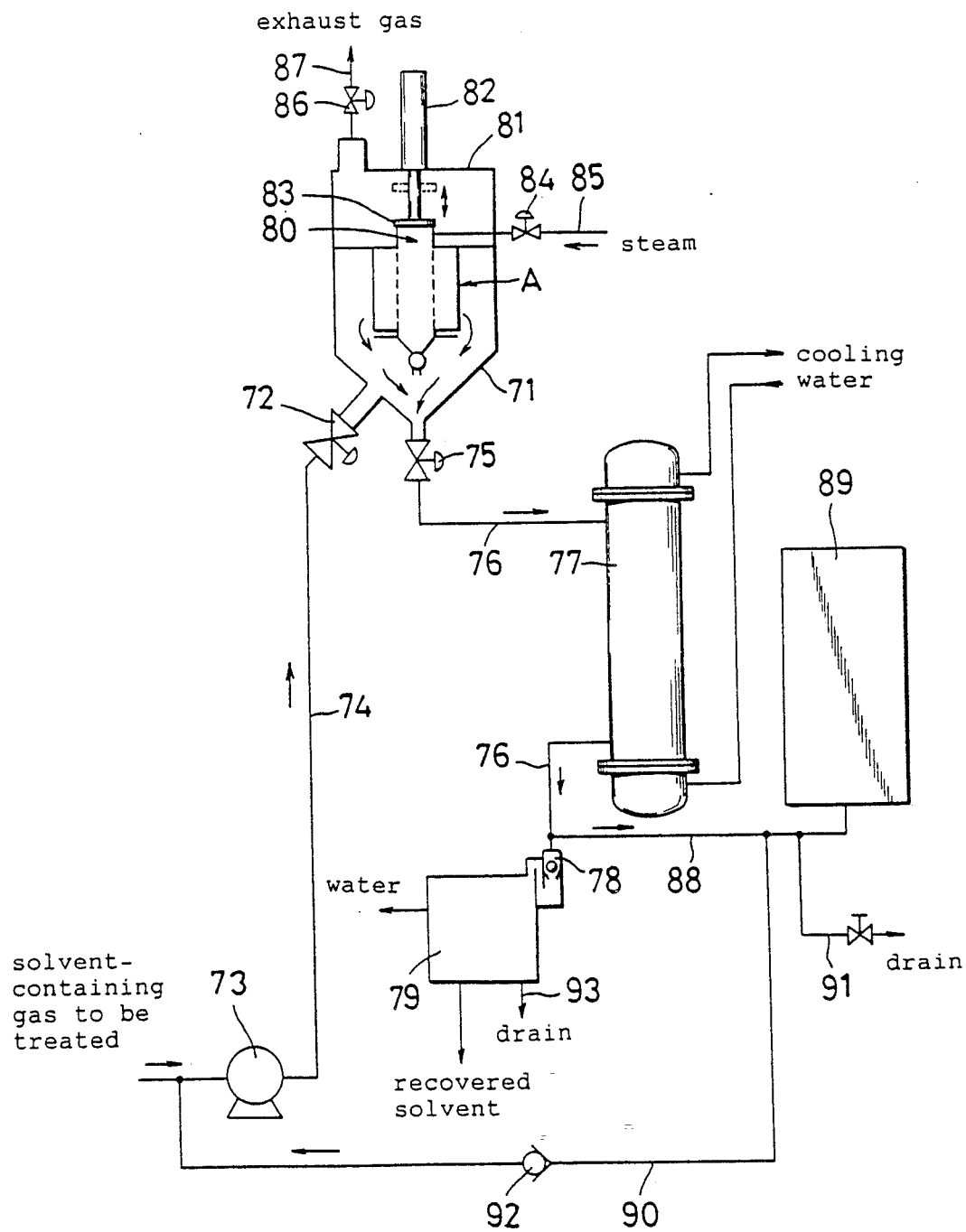
FIG. 8 is a schematic diagram of a solvent recovery apparatus in accordance with a still further embodiment of the present invention.
Figure 9A:
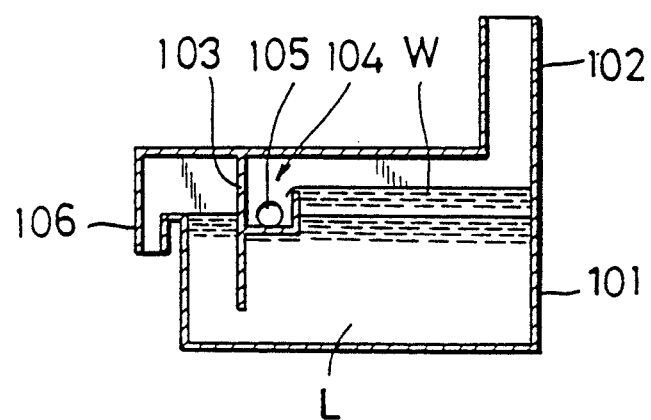
FIG. 9 (a) and (b) are section views of a conventional specific-gravity separating unit.
Figure 9B:
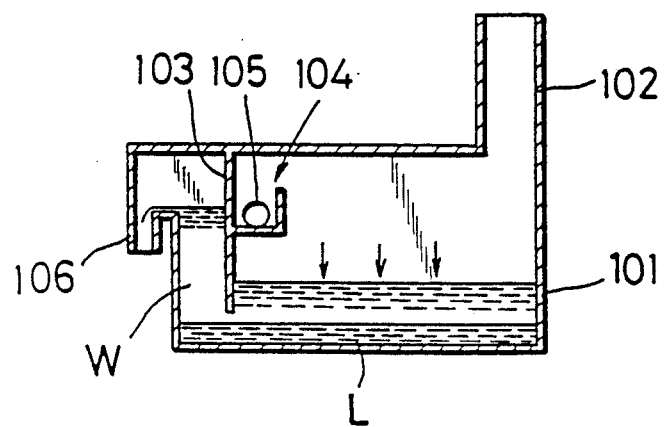

FIG. 8 shows a solvent recovery apparatus of the one-tower type in accordance with the present invention.

This apparatus has an adsorption tower 71 to which a gas adsorption element A is attached. Connected to the lower space of the adsorption tower 71 is a gas supply pipe 74 through a first motor ball valve 72, and a solvent recovery pipe 76 through a second motor ball valve 75. A gas supply blower 73 for supplying a solvent-containing gas to be treated to the tower 71 is disposed at the gas supply pipe 74. A condenser 77, an intermediate liquid storing unit 78 and a specific-gravity separating unit 79 are successively connected to the solvent recovery pipe 76.

Formed at the upper portion of the adsorption tower 71 is an exhaust portion 80 for exhausting gas of which the solvent has been adsorbed and removed. An air cylinder 82 is attached to a cover 81 which covers the upper portion of the adsorption tower 71. Attached to the air cylinder 82 is a valve body 83 for opening/closing the exhaust portion 80. A steam supply pipe 85 for supplying steam to the adsorption tower 71 closed by the valve body 83, is connected to the exhaust portion 80 through a third motor ball valve 84. An exhaust pipe 87 is connected to the cover 81 through a fourth motor ball valve 86.

A by-pass pipe 88 is connected to the solvent recovery pipe 76 between the condenser 77 and the intermediate liquid storing unit 78 which is adjacent to the specific-gravity separating unit 79 and which is arranged in the same manner as in the embodiment shown in FIGS. 1 and 2(a), (b). Connected to the by-pass pipe 88 is a buffer unit 89 for temporarily storing gas components which have not been liquefied by the condenser 77, the capacity of the buffer unit 89 being variable. This buffer unit 89 is formed by a casing and an expandable bag body housed therein.

A portion of the by-pass pipe 88 is connected to that portion of the gas supply pipe 74 upstream of the gas supply blower 73 by a recycle pipe 90. The gas components stored in the buffer unit 89 are supplied to the gas supply pipe 74 and the adsorption tower 71 through the recycle pipe 90. Connected to the by-pass pipe 88 is a drain pipe 91 for discharging the liquid in the buffer unit 89. Connected to the recycle pipe 90 is a check valve 92 for restraining the inflow of the solvent-containing gas to be treated from the gas supply pipe 74 to the buffer unit 89. A drain pipe 93 for discharging a residual liquid is connected to the specific-gravity separating unit 79.

According to the solvent recovery apparatus of the one-tower type, at the time of solvent adsorption, the first and fourth motor ball valves 72, 86 are opened, and the valve body 83 is raised to open the exhaust portion 80. Also, the second and third motor ball valves 75, 84 are closed, and the solvent-containing gas to be treated is supplied to the adsorption tower 71 through the gas supply pipe 74 from the gas supply blower 73. The solvent-containing gas to be treated passes through a gas adsorption element A of the adsorption tower 71 so that the solvent is adsorbed by activated carbon fibers of the gas adsorption element A.

To remove the solvent thus adsorbed, the first and fourth motor ball valves 72, 86 are closed and the valve body 83 is lowered to close the exhaust portion 80. Also, the second and third motor ball valves 75, 84 are opened and the steam is supplied from the steam supply pipe 85 to the adsorption tower 71. The solvent adsorbed by the gas adsorption element A of the gas adsorption tower 71 is heated and removed by the steam to regenerate the activated carbon fibers. Together with the steam, the solvent thus removed is supplied, through the solvent recovery pipe 76, to the condenser 77 where the solvent and the steam are condensed and liquefied. The resultant liquid mixture is supplied to the specific-gravity separating unit 79, where the liquefied solvent is recovered as separated from the water. Even though the internal pressure of the adsorption tower 71 is increased with the supply of the steam at the time when solvent removal starts, the valve of the intermediate liquid storing unit 78 intercepts the transmission of the increased pressure to the specific-gravity separating unit 79. With the increase in the internal pressure of the adsorption tower 71, both the solvent-containing gas not liquefied by the condenser 77 and the gas in the intermediate liquid storing unit 78 flow, through the by-pass pipe 88, into the buffer unit 89 of which capacity is variable according to pressure variations. These gases are stored in the buffer unit 89 to restrain the pressure in the condenser 77 or the intermediate liquid storing unit 78 from being increased. Since a negative pressure is generated in the recycle pipe 90 due to the operation of the gas supply blower 73 at the time of solvent adsorption, the gases stored in the buffer unit 89 receive a suction force and are supplied to the adsorption tower 71 through the recycle pipe 90. These gases are subjected again to an adsorption treatment. This prevents the leakage to the outside of (i) a solvent-containing gas at a high concentration present in a gaseous phase in the condenser 77 and (ii) gas containing the solvent which has not been condensed and liquefied by the condenser 77 at the time of solvent removal. Thus, the efficiency of solvent recovery may be enhanced.

The following description will discuss the results of tests conducted on the solvent recovery apparatus of the present invention.

When air having a pressure of 400 mm $H_2O$ was let flow into the solvent recovery apparatus of the one-tower type above-mentioned and having a float valve 23 and an intermediate liquid storing unit 24 as shown in FIG. 2, the float valve 23 was closed to intercept the inflow of the air into the specific-gravity separating unit 8. This prevented the transmission of the pressure to the specific-gravity separating unit 8 due to a sudden increase in internal pressure.

In this solvent recovery apparatus, gas containing tetrachloroethylene exhausted from a dry cleaning machine was subjected to an adsorption treatment, and the steam was supplied to remove the adsorbed solvent. Then, there was recovered liquefied tetrachloroethylene with which no water was contaminated and which can be reused as it is. In this solvent recovery apparatus, gas containing Flon-113 was subjected to adsorption and removal treatments in the same manner as above-mentioned. Then, there was recovered liquefied Flon-113 with which no water was contaminated and which can be reused as it is.

It is apparent from the test results above-mentioned that the solvent recovery apparatus of the one-tower type also securely and satisfactorily achieves the separation of water from a liquefied solvent by specific gravity, without adverse effect exerted on such separation by specific gravity.

The gas adsorption element may be comprised of active carbon in the form of fibers, particles or blocks, and preferably activated carbon fibers presenting a high adsorption speed and a great adsorption capacity.

In the embodiment shown in FIG. 8, when the recycle pipe 90 is connected to the suction side of the gas supply blower 73, a negative pressure is produced in the recycle pipe 90, thus eliminating the check valve 92 used in the embodiment mentioned earlier. Alternately, a return blower may be connected to the recycle pipe 90 so that the gas components stored in the buffer unit 89 are returned to the gas supply pipe 74. In this case, the recycle pipe 90 is connected to that portion of the gas supply pipe 74 downstream of the gas supply blower 73.

In the solvent recovery apparatus having a plurality of adsorption towers 1a, 1b shown in FIG. 1, a capacity-variable buffer unit similar to that above-mentioned, may be disposed between the condenser 7 and the intermediate liquid storing unit 24 to store the solvent-containing gas which has not been liquefied by the condenser 7.

The buffer unit may be arranged such that the capacity thereof is variable according to pressure variations and such that the gas components supplied from the condenser are stored therein at the time of solvent removal. The material of the bag body may be or may not be stretchable. The buffer unit is preferably formed by a bag made of a soft sheet which is insoluble in a solvent.

Alternately, the buffer unit may be formed by, for example, a cylinder and a slidable member such as a piston which is lifted or lowered in the cylinder. In this case, there may be adjusted the own weight of the slidable member, or may be disposed a spring such as a coil spring for moving the slidable member from the up-side to the down-side. In this case, it is possible to adjust, by adjusting the spring load, the amount of the gas stored in the cylinder or the speed for returning the gas to the gas supply pipe at the time of solvent adsorption.

Further, the slidable member may be connected, slidably in the cylinder, to a drive mechanism such as an electric motor, an air cylinder or the like, so that at the time of solvent removal, the drive mechanism is operated at predetermined timing to start gas suction, and so that at the time of solvent adsorption, the drive mechanism is operated at predetermined timing to start gas discharge.

The solvent recovery apparatus in accordance with the present invention may be applied to a variety of uses for recovering organic solvents in chemical factories, cleaning factories and the like.

What is claimed is:

1. A solvent recovery apparatus including:
   an adsorption tower having a gas adsorption element and an openable exhaust portion;
   a gas supply pipe connected to the tower for supplying a solvent-containing gas to be treated to said tower;
   a steam supply pipe connected to the tower for supplying steam to said tower to heat said adsorption element for solvent removal, the steam carrying away the solvent from the adsorption element;
   a solvent recovery pipe connected to the tower for carrying from said tower the steam and the removed solvent carried therein;
   a condenser connected to said solvent recovery pipe for cooling and liquefying the steam and the solvent carried therein to form a liquid mixture and discharging the liquid mixture;
   a specific-gravity separating unit for receiving the discharged liquid mixture downstream of the condenser and separating the liquid mixture by specific gravity, thereby to recover a liquefied solvent, said condenser having an output for discharging the liquid mixture to said separating unit; and
   blocking means, for preventing a transmission of gas pressure from said tower to said separating unit.

2. A solvent recovery apparatus according to claim 1, wherein the gas adsorption element comprises activated carbon fibers.

3. A solvent recovery apparatus according to claim 1, wherein the valve is a float valve adapted to be opened due to buoyancy of the liquid mixture when the intermediate liquid storing unit stores said amount of the liquid mixture.

4. A solvent recovery apparatus according to claim 3, wherein the float valve comprises a float valve body adapted to be raised by the buoyancy of the liquid mixture and a valve seat adapted to receive and support said float valve body at a closed position in which said float valve is closed, said float valve having between said float valve body and said valve seat a passage in which a small amount of a liquid flows while said float valve body is located in the closed position.

5. A solvent recovery apparatus according to claim 1, wherein the specific-gravity separating unit comprises:
   a casing having an inside, the inside of said casing including a first space which communicates with the intermediate liquid storing unit and a second space;
   a partition wall which partitions said inside of said casing into the first and second spaces such that said first and second spaces communicate with each other at the lower portions thereof, said first space communicating with the intermediate unit;
   a liquid receiving portion formed at an upper portion of said casing in said first space;
   a drain port formed in said casing at said liquid receiving portion; and
   an outlet port formed in said casing in said second space.

6. A solvent recovery apparatus according to claim 1, comprising a plurality of adsorption towers, the apparatus further comprising control means for controlling the supply of the solvent-containing gas and steam to the towers via the gas supply pipe and the steam supply pipe, respectively, such that the supply of the gas among the towers alternates and in each tower adsorption of the solvent in the solvent-containing gas by the gas adsorption element and removal of the solvent adsorbed by said gas adsorption element are alternately carried out.

7. A solvent recovery apparatus according to claim 1, wherein the apparatus includes only one adsorption tower, the apparatus further comprising control means for controlling the supply of the solvent-containing gas and steam to the one adsorption tower via the gas supply pipe and the steam supply pipe, respectively, such that adsorption of the solvent in the solvent-containing gas by the gas adsorption element and removal of the solvent adsorbed by said gas adsorption element are alternately carried out.

8. A solvent recovery apparatus according to claim 1, further comprising a flow path, having opposite ends in respective communication with said separating unit and said output of said condenser, for carrying the discharged liquid mixture from said condenser to said separating unit, said blocking means being disposed in said flow path.

9. A solvent recovery apparatus according to claim 8, wherein said blocking means includes means for blocking a gaseous flow from said condenser to said separating unit along said flow path, including an intermediate liquid storing unit for storing in said path a quantity of the liquid mixture discharged by the condenser such that the stored quantity blocks gaseous communication between the condenser and the separating unit along said path, said storing unit including a valve in said path which automatically closes said path to block a gaseous flow therealong, when the stored quantity of the liquid mixture is below a preset value, said valve automatically opening said path to the flow of the liquid mixture when the stored quantity is greater that the preset value, so that the liquid mixture in excess of the preset value flows from said storing unit into said separating unit.

10. A solvent recovery apparatus according to claim 9, further comprising a gas supply blower connected to the gas supply pipe, and a recycle pipe connecting an upper portion of the intermediate liquid storing unit upstream of said valve to a suction side of the gas supply blower.

11. A solvent recovery apparatus according to the claim 9, comprising a plurality of adsorption towers, the apparatus further comprising control means for controlling the supply of the solvent-containing gas and steam to the towers via the gas supply pipe and the steam supply pipe, respectively, such that the supply of the gas among the towers alternates and in each tower adsorption of the solvent in the solvent-containing gas by the gas adsorption element and removal of the solvent adsorbed by said gas adsorption element are alternately carried out, further comprising a buffer unit, having a variable capacity and being coupled with said flow path, for storing solvent-containing gas, a gas supply blower connected to the gas supply pipe, and a recycle pipe connecting said buffer unit to a suction side of the gas supply blower.

12. A solvent recovery apparatus according to claim 11, wherein the variable capacity buffer unit is formed by a bag made of a soft sheet which is insoluble in the solvent.

13. A solvent recovery apparatus according to claim 9, wherein the apparatus includes only one adsorption tower, the apparatus further comprising control means for controlling the supply of the solvent-containing gas and steam to the one adsorption tower via the gas supply pipe and the steam supply pipe, respectively, such that adsorption of the solvent in the solvent-containing gas by the gas adsorption element and removal of the solvent adsorbed by said gas adsorption element are alternately carried out, further comprising a buffer unit coupled to said flow path for storing the solvent-containing gas, said buffer unit having a variable capacity, a gas supply blower connected to the gas supply pipe, and a recycle pipe connecting said buffer unit to the suction side of the gas supply blower.

14. A solvent recovery apparatus according to claim 13, wherein the variable capacity buffer unit is formed by a bag made of a soft sheet which is insoluble in the solvent.

15. A solvent recovery apparatus according to claim 9, wherein the apparatus includes only one adsorption tower, the apparatus further comprising control means for controlling the supply of the solvent-containing gas and steam to the one adsorption tower via the gas supply pipe and the steam supply pipe, respectively, such that adsorption of the solvent in the solvent-containing gas by the gas adsorption element and removal of the solvent adsorbed by said gas adsorption element are alternately carried out, further comprising a buffer unit, having a variable capacity, for storing the solvent-containing gas, a gas supply blower connected to the gas supply pipe, and a recycle pipe having a return blower, connecting said buffer unit to an upstream side of the gas supply blower for returning said solvent-containing gas stored in said buffer unit to said one adsorption tower.

16. A solvent recovery apparatus according to claim 15, wherein the variable capacity buffer unit is formed by a bag made of a soft sheet which is insoluble in the solvent.

* * * * *